United States Patent
Yang et al.

(10) Patent No.: US 6,818,151 B2
(45) Date of Patent: Nov. 16, 2004

(54) OXYGEN BARRIER COPOLYMER

(75) Inventors: Hu Yang, San Ramon, CA (US); Ta Yen Ching, Novato, CA (US); Kevin Cai, Danville, CA (US); Lennard Torres, Pleasanton, CA (US)

(73) Assignee: Chevron Phillips Chemical Company LP, The Woodlands, TX (US)

(*) Notice: Subject to any disclaimer, the term of this patent is extended or adjusted under 35 U.S.C. 154(b) by 397 days.

(21) Appl. No.: 09/998,773

(22) Filed: Nov. 30, 2001

(65) Prior Publication Data

US 2003/0218152 A1 Nov. 27, 2003

(Under 37 CFR 1.47)

(51) Int. Cl.[7] .......................... C09K 15/04; B32B 7/00; B29D 22/00
(52) U.S. Cl. .............. 252/188.28; 428/34.2; 428/34.3; 428/35.2; 428/35.4; 428/36.6; 428/36.7
(58) Field of Search ............... 252/188.28; 428/34.2, 428/34.3, 35.2, 35.4; 426/392, 397, 398, 399, 36.6, 36.7

(56) References Cited

U.S. PATENT DOCUMENTS

| | | | |
|---|---|---|---|
| 3,497,571 A | 2/1970 | Tellier et al. | 260/844 |
| 3,536,687 A | 10/1970 | Nordstrom | 260/89.5 |
| 4,415,710 A | 11/1983 | Barnabeo et al. | 525/370 |
| 4,524,201 A | 6/1985 | Barnabeo et al. | 528/395 |
| 4,857,409 A * | 8/1989 | Hazelton et al. | 428/494 |
| 5,116,916 A | 5/1992 | Young | 525/350 |
| 5,211,875 A | 5/1993 | Speer et al. | 252/188.28 |
| 5,273,797 A * | 12/1993 | Hazelton et al. | 428/34.7 |
| 5,346,644 A | 9/1994 | Speer et al. | 252/188.28 |
| 5,425,896 A | 6/1995 | Speer et al. | 252/188.28 |
| 5,466,756 A | 11/1995 | Roach et al. | 525/330.6 |
| 5,498,364 A | 3/1996 | Speer et al. | 252/188.28 |
| 5,627,239 A | 5/1997 | Ching et al. | 525/330.6 |
| 5,641,825 A | 6/1997 | Bacskai et al. | 524/398 |
| 5,656,692 A | 8/1997 | Hayes | 525/63 |
| 5,660,761 A | 8/1997 | Katsumoto et al. | 252/188.28 |
| 5,700,554 A | 12/1997 | Speer et al. | 428/220 |
| 5,736,616 A | 4/1998 | Ching et al. | 525/330.3 |
| 5,776,361 A | 7/1998 | Katsumoto et al. | 252/188.28 |
| 5,837,158 A | 11/1998 | Shepodd et al. | 252/181.6 |
| 5,859,145 A | 1/1999 | Ching et al. | 525/330.6 |
| 6,057,013 A | 5/2000 | Ching et al. | 428/35.7 |
| 6,063,307 A | 5/2000 | Shepodd et al. | 252/181.6 |
| 6,254,803 B1 * | 7/2001 | Matthews et al. | 252/188.28 |

(List continued on next page.)

FOREIGN PATENT DOCUMENTS

| WO | WO99/48963 | 9/1999 |
|---|---|---|
| WO | WO01/10948 | 2/2001 |

OTHER PUBLICATIONS

PCT/US02/35970 International Search Report (May 8, 2003).

Ching et al., "Tasteless Oxygen Scavenging Polymers: A New Platform Technology for Food Packaging Based On Controlled Oxidation," *Oxygen Absorber . . . 2001 and Beyond*, OSP Conference, pp. 1–8 (Chicago, Jun. 19–20, 2000).

(List continued on next page.)

*Primary Examiner*—Joseph D. Anthony
(74) *Attorney, Agent, or Firm*—Williams, Morgan & Amerson, P.C.

(57) ABSTRACT

Oxygen barrier copolymers and methods of making the same are disclosed. The oxygen barrier copolymers comprise repeating units derived from vinylidene chloride and oxygen scavenging repeating units. The oxygen scavenging repeating units can comprise oxygen scavenging moieties that are cycloalkenyl. Oxygen barrier compositions, methods of preparing oxygen barrier compositions, and packaging articles comprising oxygen barrier copolymer are also disclosed.

17 Claims, 1 Drawing Sheet

U.S. PATENT DOCUMENTS

| | | | |
|---|---|---|---|
| 6,254,804 B1 * | 7/2001 | Matthews et al. | 252/188.28 |
| 6,313,241 B1 * | 11/2001 | Gauthier et al. | 526/160 |
| 6,333,087 B1 * | 12/2001 | Jerdee et al. | 428/35.9 |
| 6,376,095 B1 * | 4/2002 | Cheung et al. | 428/516 |
| 6,517,776 B1 * | 2/2003 | Rodgers et al. | 422/24 |
| 6,527,976 B1 * | 3/2003 | Cai et al. | 252/188.28 |
| 6,572,783 B1 * | 6/2003 | Cai et al. | 252/188.28 |
| 6,682,791 B2 * | 1/2004 | McKnight | 428/35.2 |
| 2001/0023025 A1 * | 9/2001 | Jerdee et al. | 428/478.8 |
| 2002/0022144 A1 * | 2/2002 | Yang et al. | 428/520 |
| 2002/0081358 A1 * | 6/2002 | Galland et al. | 426/398 |
| 2002/0136916 A1 * | 9/2002 | Cheung et al. | 428/517 |
| 2002/0155233 A1 * | 10/2002 | McKnight | 428/35.2 |
| 2002/0176955 A1 * | 11/2002 | Hayashi et al. | 428/36.6 |
| 2003/0018114 A1 * | 1/2003 | Tai et al. | 524/413 |
| 2003/0235669 A1 * | 12/2003 | Yang et al. | 428/36.6 |
| 2004/0058178 A1 * | 3/2004 | Yang et al. | 428/520 |
| 2004/0096683 A1 * | 5/2004 | Ikeda et al. | 428/500 |

OTHER PUBLICATIONS

Ching et al., "Tasteless Oxygen Scavenging Polymers: A New Platform Technology for Food Packaging Based On Controlled Oxidation," *Oxygen Absorber . . . 2001 and Beyond*, OSP Conference Slides (Chicago, Jun. 19–20, 2000).

* cited by examiner

OXYGEN BARRIER COPOLYMER

BACKGROUND OF THE INVENTION

1. Field of the Invention

The present invention relates generally to the field of oxygen barrier polymers. More particularly, it concerns oxygen barrier compositions and packaging articles comprising a copolymer that comprises (1) repeating units derived from vinylidene chloride and (2) repeating units comprising an oxygen scavenging moiety.

2. Description of Related Art

Due at least in part to their ability to be fabricated into packaging articles of various sizes and shapes (e.g., their design flexibility), plastic materials, such as organic polymers, are becoming increasingly important in the packaging industry. The use of organic polymers in films, bottles, coatings, and liners has become commonplace in packaging. However, while the use of organic polymers has expanded in many areas, their usefulness has been limited in packaging requiring good barrier properties to atmospheric gases (primarily oxygen). This has been because the barrier properties of available organic polymers have not been able to approach the barrier properties of traditional packaging materials, such as glass and metal. New materials having enhanced barrier performance, while retaining benefits inherent to organic polymers would be useful both to the packaging and plastic manufacturing industries.

Organic polymers can be classified by how permeable they are to gases (e.g., oxygen or carbon dioxide) and moisture vapor. Those organic polymers that significantly restrict the ability of gases to pass through them are referred to as gas barrier polymers or high barrier polymers. The use of high barrier polymers is very important in the packaging of certain foods and beverages, which require protection from oxygen and moisture. Vinylidene chloride based polymers (PVDC) and copolymers were discovered some time ago, and they are among the most widely used high oxygen barrier resins. Perhaps the most familiar examples of the vinylidene chloride based polymers used in packaging are commercial Saran® products. Other high oxygen barrier polymers also widely used, include ethylene vinyl alcohol (EVOH) copolymers. However, EVOH copolymers lack the moisture resistance properties associated with vinylidene chloride based polymers, and therefore, EVOH copolymers are often combined with additional moisture barrier polymers in packaging structures. Packaging comprising high gas barrier polymers, such as PVDC and EVOH, can be inadequate in protecting certain packaged oxygen sensitive products, such as beer and juice, from environmental oxygen. This has prompted extensive efforts to modify organic polymers or packaging structures made from them to enhance oxygen barrier properties. Such efforts have included chemical modification of organic polymers (e.g., fluoridation or sulfonation of organic polymers), and structural variation in packaging design.

For example, "hybrids" having improved gas barrier performance have been developed. The hybrids involve thin-layer surface coating or deposition of silica or graphite over an organic polymer substrate. Other developments have involved inorganic-organic alloys (nanocomposites) comprising gas impermeable inorganic fillers dispersed in an organic polymer matrix. This technology has resulted in enhanced gas barrier performance as the result of the "tortuous path effect," however these approaches have had limited commercial success due to the cost associated with the additional fabrication steps involved. Thus, it would be desirable to be able to structurally modify PVDC based polymers in such a way that their oxygen barrier performance approaches that of traditional materials, such as glass and metal, for use in more demanding packaging applications.

PVDC based polymers are among the best oxygen barrier polymers, but as discussed above they can be inadequate for use in certain packaging applications for oxygen sensitive food and beverages. PVDC homopolymer is rarely used as a packaging material by itself due to its narrow melt processing temperature. However various PVDC copolymers that comprise small amounts of a comonomer, such as vinyl chloride, methylacrylate or acrylontrile have had some commercial success. While these copolymers offer the desired melt process capability due to their reduced melting points, their gas barrier performance is compromised due to their decreased crystallinity and due to dilution of the vinylidene chloride. Thus, from both a technological and commercial point of view, it would be highly desirable to enhance the gas barrier properties of polymers that are commercially available (e.g., PVDC), while improving their processability.

Another approach to providing packaging for oxygen sensitive products involves inorganic and/or organic oxygen scavengers being used in packaging structures to eliminate or reduce the oxygen inside a package. Oxygen scavengers that can be used include iron powders and unsaturated olefinic polymers. In oxygen scavenging packaging, oxygen within the package or that diffuses through the packaging wall from the outside environment is removed by the irreversible reaction of the oxygen scavenger with the oxygen. In the case of polymeric oxygen scavengers, the oxygen scavenging functionality can be an unsaturated olefinic moiety, which can be incorporated into or grafted onto a polymer. Because these polymers were developed to aid in the removal of headspace oxygen from a package, they typically have relatively high oxygen transmission rates, so that the oxygen within the headspace can easily reach the reactive site (scavenging site) and so that it is reacted at a sufficiently rapid rate. Therefore, most oxygen scavenging polymers used in packaging, such as polyolefins and acrylate polymers, have relatively high oxygen transmission rates and/or relatively low oxygen barrier properties. Oxygen scavenging polymers obtained by grafting cycloalkenyl molecules onto an ethylene-methylacrylate polymer via a reactive extrusion process (Ta Yen Ching et al., Patent Application WO99/48963) represent a significant development in the field of oxygen scavenging packaging. An important advantage of this type of oxygen scavenging polymer is that the oxygen scavenging functionality is based on a cycloalkenyl moiety, which does not result in volatile by-products being formed from the oxygen scavenging reaction.

SUMMARY OF THE INVENTION

In the development of new packaging materials, the properties of processability and product performance have typically been found to be interrelated, so that often a compromise has had to be reached favoring one property over the other. This is exemplified in the way in which commercial PVDC copolymers have evolved through the chemical modification of PVDC homopolymer. Commercially successful PVDC copolymers have been made by incorporating small amounts of a comonomer into PVDC polymers improving their processability, however the new copolymers have reduced gas barrier properties as compared to PVDC homopolymer.

The present invention is directed to a novel approach to chemically modifying the PVDC polymer structure that achieves both enhanced oxygen barrier performance and good processability (due to decreased melting point). The present invention is based on the surprising discovery that an oxygen-scavenging vinyl cycloalkenylacrylate monomer can be successfully incorporated into the polymer structure of PVDC by free radical polymerization. The oxygen scavenging vinyl cycloalkenylacrylate monomer has two carbon-carbon double bonds, one in the vinyl moiety of the monomer and the other in the cycloalkenyl moiety of the monomer. The polymerization of vinylidene chloride with the cycloalkenyl acrylate monomer is believed to proceed primarily through reaction of the vinyl double bond of the oxygen scavenging monomer with the carbon-carbon double bond of the vinylidene chloride. Reaction of vinylidene chloride with the double bond of the cycloalkenyl moiety of the oxygen scavenging monomer is believed to be minimal during the polymerization reaction.

The successful incorporation of the vinyl cycloalkenylacrylate into a PVDC polymer results in a polymer, which in the presence of an oxidation catalyst (e.g., cobalt salts), is capable of intercepting or scavenging oxygen as it passes through the composition. The polymer of the present invention is different from conventional oxygen barrier polymers (e.g., PVDC copolymers and EVOH as described above), which act as passive oxygen barriers that are meant to hermetically restrict the diffusion of oxygen into the packaging structure. Another significant aspect of certain compositions of the present invention is that their melting points are reduced sufficiently that their process temperature range is improved. Thus, certain compositions of the present invention can provide improved oxygen barrier properties, while at the same time introducing a desirable reduction in the melting point for easier processing than is typically encountered with other PVDC copolymers. Other benefits of certain methods and compositions of the present invention include the following:

a) improved cost effectiveness, because only a small amount of monomer having oxygen scavenging functionality would be required in PVDC copolymers of the present invention for intercepting oxygen that diffuses from the headspace or from the environment external to the package, resulting in a high gas barrier;

b) optical clarity of PVDC copolymers of the present invention is ensured, because the oxygen scavenging functionality is chemically bonded to the PVDC polymer (this is an improvement over the approach in which an oxygen scavenging component is blended with structural polymers, such as MXD6 in PET, which can result in poor optical clarity);

c) improved barrier properties in packaging applications involving high humidity/high temperature due to the scavenging capacity present in PVDC copolymers of the present invention (this overcomes some of the problems associated with certain high barrier oxygen barrier copolymers, such as EVOH copolymers, as discussed above); and d) reduction in volatile by-products of the oxygen scavenging reaction, since the reaction of oxygen with the cycloalkenyl ring structure of the oxygen scavenging comonomer does not result in fragmentation by-products (this overcomes the problems associated with some oxygen scavenging polymers, such as polybutadiene, which generate volatile oxidation by-products during scavenging).

In one embodiment, the present invention is directed to an oxygen barrier composition that comprises an oxygen barrier copolymer. Preferably the composition also comprises an oxidation catalyst. The oxygen barrier copolymer in turn comprises repeating units having the formula (I), and repeating units having formula (II). The composition comprises at least about 50 mole % of repeating units having formula (I) and at least about 2 mole % of repeating units having formula (II).

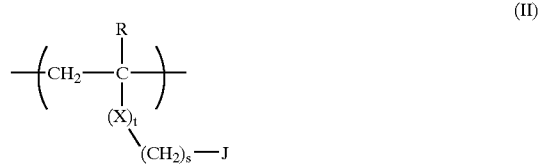

In formula (II), R is hydrogen or methyl; X is —(C=O)—O—, —O—(C=O)—, —(C=O)—NH—, —O—; t is 0 or 1; s is an integer between 0 and 12, inclusive; and J is a cycloalkenyl group. Preferably the cycloalkenyl is cyclohexenyl, a substituted cyclohexenyl, norbornenyl, or a substituted norbornenyl. Preferably substituted cyclohexenyls and substituted norbornenyl have methyl groups as substituents moieties. In a preferred embodiment, the cycloalkenyl is a chemical group having the formula (VI)

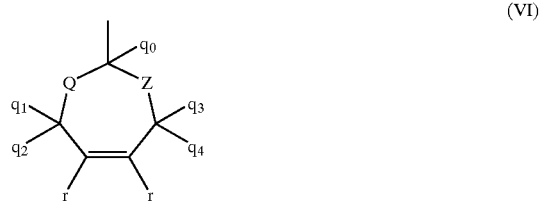

Q is —(CR$_2$R$_3$)$_n$—, wherein n is an integer from 0 to 3, inclusive. Z is —(CR$_4$R$_5$)$_e$—, wherein e is an integer from 0 to 3, inclusive, and n+e≦3, q$_0$, q$_1$, q$_2$, q$_3$, q$_4$, r, each R$_2$, each R$_3$, each R$_4$, and each R$_5$ are independently selected from hydrogen, linear C$_1$–C$_{20}$ alkyls, branched C$_1$–C$_{20}$ alkyls, cyclic C$_1$–C$_{20}$ alkyls, polycyclic C$_1$–C$_{20}$ alkyls, aromatic groups, halogens, and sulfur-containing substituents, and when r is hydrogen at least one of q$_1$, q$_2$, q$_3$, and q$_4$ is hydrogen. Preferably the group is cyclohexenyl.

In another preferred embodiment, the cycloalkenyl is a group having the formula (VII)

q$_1$, q$_2$, and r are independently selected from hydrogen, linear C$_1$–C$_{20}$ alkyls, branched C$_1$–C$_{20}$ alkyls, cyclic C$_1$–C$_{20}$ alkyls, polycyclic C$_1$–C$_{20}$ alkyls, aromatic groups, halogens, and sulfur-containing substituents, and when r is hydrogen at least one of q$_1$, and q$_2$ is hydrogen.

The oxygen barrier copolymer that is described above and that is a component of the oxygen barrier composition comprises at least about 50 mole % of repeating units having formula (I) and at least about 2 mole % of repeating units having formula (II). More preferably the oxygen barrier copolymer comprises at least about 5 mole %, and even more preferably, between about 5 mole % and about 30 mole % of repeating units having formula (III). In certain embodiments, the oxygen barrier composition further comprises a photoinitiator and/or an antioxidant.

In certain embodiments oxygen scavenging repeating units of the oxygen barrier copolymer can have a formula other than formula (II). Such oxygen scavenging repeating units comprise an oxygen scavenging, benzylic structure, such as benzyl acrylate or benzyl methacrylate.

In certain embodiments, the oxygen barrier composition can comprise a polymer blend comprising an oxidation catalyst, the oxygen barrier copolymer described above, and polyvinylidene chloride polymer (e.g., PVDC homopolymer or PVDC copolymer comprising comonomers such as methyl acrylate, methyl methacrylate, acrylonitrile, or vinyl chloride). In such cases, the mole % of the repeating units having the oxygen scavenging functionality of structure (II) can be increased in order to compensate for any dilution effects resulting from blending with other polymers. Preferably, at least about 5% by weight of the oxygen barrier copolymer is oxygen scavenging repeating units in the blend composition.

Yet another embodiment is directed to a method of preparing an oxygen barrier composition comprising, blending polyvinylidene chloride polymer (e.g., homopolymer or copolymer) with an oxidation catalyst, and an oxygen barrier copolymer, as described above. In certain embodiments the oxygen barrier composition can further comprise a photoinitiator. The oxygen barrier copolymer comprises at least 50 mole % of repeating units having formula (I) and at least about 2 mole % of repeating units having formula (II). More preferably the oxygen barrier copolymer comprises between about 5 mole % and about 30 mole % of repeating units having formula (II).

Another embodiment of the present invention is directed to a method of preparing an oxygen barrier copolymer as described above, comprising reacting a plurality of monomers to produce an oxygen barrier copolymer. The plurality of monomers reacted comprise vinylidene chloride monomers and vinyl monomers having formula (III).

(III)

R is hydrogen or methyl; X is —(C=O)—O—, —O—(C=O)—, —(C=O)—NH—, —O—; t is 0 or 1; s is an integer between 0 and 12, inclusive; and J is a cycloalkenyl group. Preferably the cycloalkenyl is cyclohexenyl, a substituted cyclohexenyl, norbornenyl, or a substituted norbornenyl. Preferably substituted cyclohexenyls and substituted norbornenyls have methyl groups as substituents moieties. In a preferred embodiment, the cycloalkenyl is a chemical group having the formula (VI) or formula (VII), as described above.

Preferably the cycloalkenyl oxygen scavenging moiety of formula (III) is cyclohexenyl. The plurality of monomers that is reacted to produce the oxygen barrier copolymer comprises at least about 50 mole % of vinylidene chloride monomers and at least about 2 mole % of vinyl monomers having formula (III). More preferably the plurality of monomers that is reacted comprises between about 5 mole % and about 30 mole % of monomers having formula (III).

In still another embodiment, the present invention is directed to a packaging article that comprises an oxidation catalyst and at least one oxygen barrier layer comprising an oxygen barrier copolymer, as described above. The oxygen barrier layer can comprise the oxidation catalyst, or the oxidation catalyst can be in a layer adjacent to the oxygen barrier layer. The oxygen barrier layer can in certain embodiments further comprise a photoinitiator. The packaging article can further comprise materials such as antioxidants, among others. In certain embodiments, the oxygen barrier layer comprises a polymer blend comprising polyvinylidene chloride polymer (e.g., homopolymer or copolymer) and the oxygen barrier copolymer described above. The packaging article can further comprise additional layers selected from oxygen barrier layers, structural layers, and oxygen scavenging layers, among others.

Oxygen sensitive materials packaged using oxygen barrier copolymers and compositions of the present invention can have a relatively long useful shelf life, and in certain embodiments, the shelf life can be longer than when conventional oxygen barrier packaging (e.g., packaging prepared using polyvinylidene chloride (PVDC) or EVOH) is used.

BRIEF DESCRIPTION OF THE DRAWINGS

The following drawings form part of the present specification and are included to further demonstrate certain aspects of the present invention. The invention can be better understood by reference to one or more of these drawings in combination with the detailed description of specific embodiments presented herein.

DESCRIPTION OF ILLUSTRATIVE EMBODIMENTS

Figure 1:
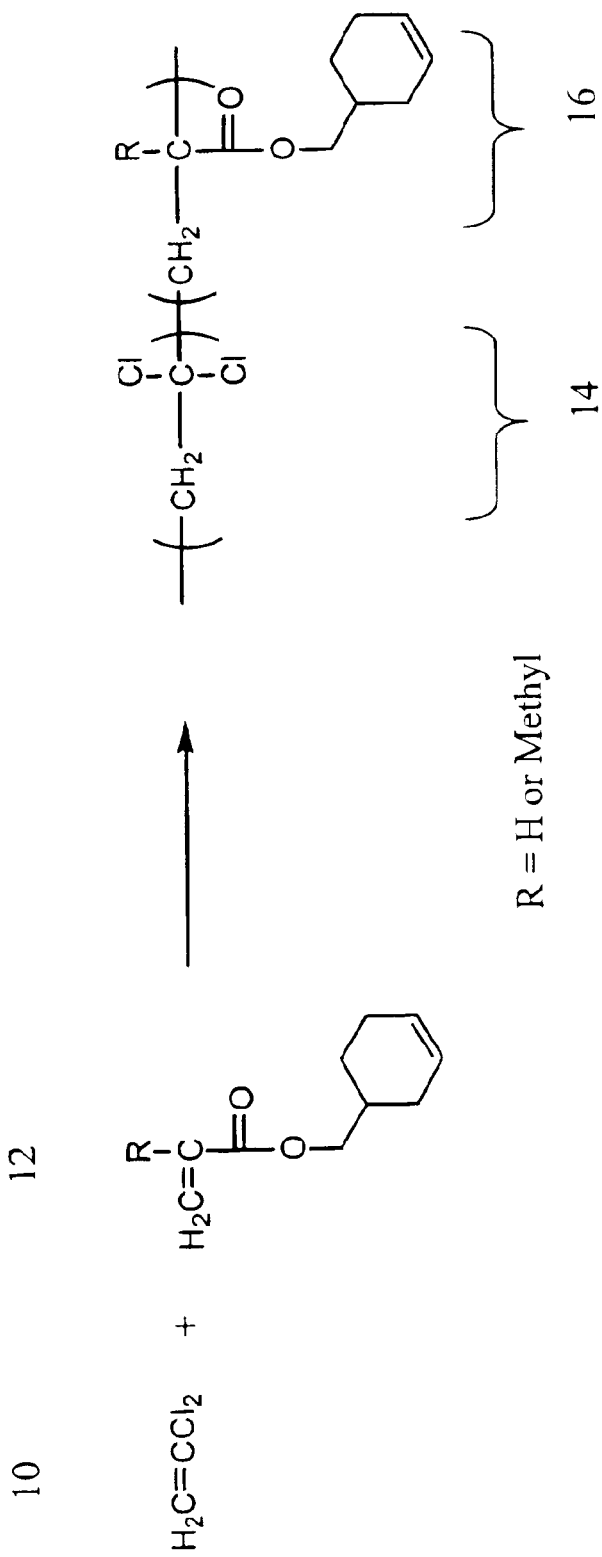
FIG. 1 depicts a scheme for preparing an oxygen barrier copolymer.

The present invention can be used in providing packaging articles that have relatively high oxygen barrier properties for an extended period of time. Packaging articles of the present invention can have better barrier properties than packaging articles that are prepared using polyvinylidene chloride polymers or polyethylene vinyl alcohol.

Polyvinylidene chloride polymers can be (A) polyvinylidene chloride homopolymers or (B) polyvinylidene chloride copolymers. It is known that polyvinylidene chloride homopolymers are difficult to process due to the melting point and the decomposition temperature being so close together. Thus polyvinylidene chloride polymers used in oxygen barriers are often polyvinylidene chloride copolymers which are made by polymerizing at least about 80 wt % vinylidene chloride with less than about 20 wt % of comonomers. Comonomers that can be used in making polyvinylidene copolymers include acrylonitrile, methyl methacrylate, methyl acrylate and vinyl chloride, among others. These comonomers can make the polyvinylidene chloride polymer easier to process.

Oxygen Barrier Copolymers

As described above, oxygen barrier copolymers of the present invention can comprise repeating units having the formula (I) (e.g., repeating units derived from vinylidene chloride) and oxygen scavenging repeating units, such as those having formula (II).

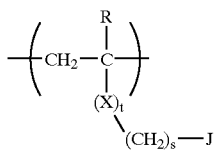

(II)

In formula (II), R is hydrogen or methyl; X is —(C=O)—O—, —O—(C=O)—, —(C=O)—NH—, —O—; t is 0 or 1; s is an integer between 0 and 12, inclusive; and J is a cycloalkenyl group. Preferably the cycloalkenyl is cyclohexenyl, a substituted cyclohexenyl, norbornenyl, or a substituted norbornenyl. In a preferred embodiment, the cycloalkenyl is a chemical group having the formula (VI) or formula (VII), as described above. In certain embodiments oxygen scavenging repeating units of the oxygen barrier copolymer can have a formula other than formula (II). Such oxygen scavenging repeating units comprise an oxygen scavenging, unsaturated olefinic moiety. They can be derived from compounds (1) comprising such an oxygen scavenging moiety and (2) having the ability to copolymerize with vinylidene chloride, provided the compound retains at least some degree of unsaturation (e.g., oxygen scavenging ability) after copolymerization. In certain embodiments oxygen scavenging repeating units of the oxygen barrier copolymer can comprise repeating units that comprise an oxygen scavenging, benzylic structure, such as benzyl acrylate or benzyl methacrylate.

The oxygen barrier copolymer of the present invention can further comprise a plurality of repeating units having formula (IV)

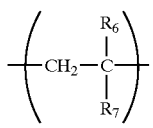

(IV)

wherein $R_6$ is hydrogen or methyl, and $R_7$ is —CN or —COOR", and wherein R" is H, or a $C_1$–$C_6$ alkyl. Preferably $R_7$ has a formula selected from the group consisting of —COOH, and —COOCH$_3$.

Another embodiment of the present invention is directed to a method of preparing an oxygen barrier copolymer, as described above. A plurality of monomers is reacted to produce the oxygen barrier copolymer. The plurality of monomers reacted comprises vinylidene chloride monomer and vinyl oxygen scavenging monomer having formula (III). The plurality of monomers comprises at least about 50 mole % of vinylidene chloride monomer and at least about 2 mole % of vinyl monomers having formula (III).

Vinyl monomers having formula (III) are particularly preferred oxygen scavenging monomers that can be reacted with vinylidene chloride monomer to produce an oxygen barrier copolymer. Formula (III) is

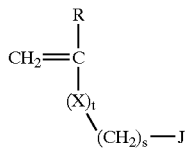

(III)

Preferences for R, X, t, s and J are as described above for formula (II).

As described above, the oxygen scavenging repeating units of the oxygen barrier copolymer can have formula (II) or they can be other repeating units that comprise an unsaturated olefinic moiety, or benzylic moiety, and they can be derived from a monomer comprising such a moiety. The oxygen scavenging, unsaturated olefinic moiety of the oxygen scavenging compound that is polymerized with vinylidene chloride monomer can be linear, branched, cyclic, polycyclic, or aromatic. The oxygen scavenging moiety (e.g., unsaturated olefinic group) can be part of the main chain of the oxygen barrier copolymer, or can be a pendant or terminal group.

Two or more oxygen scavenging monomers can be used to produce oxygen barrier copolymers of the present invention. It should be noted that the selection of an oxygen scavenging monomer for a method will depend on the intended use of the product, the oxygen scavenging monomer's ability to copolymerize with the vinylidene chloride monomer and other oxygen scavenging monomers, if any, and other parameters.

Examples of oxygen scavenging monomers that can be used to prepare oxygen barrier copolymers of the present invention include, but are not limited to those monomers containing a pendant benzylic group, such as benzylmethyl acrylate. Examples also include diene comonomers such as isoprene. The monomers themselves can be oligomers such as polypentenamer, polyoctenamer, and other oligomers prepared by olefin metathesis; diene oligomers such as squalene; and other compounds containing more than one carbon-carbon double bond (conjugated or nonconjugated), such as dicyclopentadiene, norbornadiene, or 5-ethylidene-2-norbornene.

Oxygen scavenging monomers comprising unsaturated pendant groups or cyclic or polycyclic unsaturated olefinic moieties are preferred. Cyclic or polycyclic unsaturated olefinic moieties are preferred oxygen scavenging moieties, as they typically do not undergo fragmentation upon reaction with oxygen. Examples of preferred oxygen scavenging monomers include, but are not limited to, those comprising a main chain or pendant cyclic unsaturated olefinic group, more preferably a cyclic unsaturated olefinic group having a cyclohexene structure, such as cyclohexenylmethyl acrylate, cyclohexenylmethyl methacrylate or vinyl cyclohexene.

The plurality of chemical units reacted to produce the oxygen barrier copolymer can further comprise monomers having the formula (V) in addition to the vinylidene chloride monomers and the oxygen scavenging monomers.

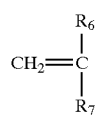

(V)

wherein R6 is hydrogen or methyl, and $R_7$ is —CN or —COOR", and wherein R" is H, or a $C_1$–$C_6$ alkyl. Preferably, $R_7$ is —COOH or —COOCH$_3$.

FIG. 1 depicts a scheme for preparing certain oxygen barrier copolymers of the present invention. A plurality of monomers comprising vinylidene chloride monomer (10) and an oxygen scavenging monomer (12) having a preferred configuration of formula (III) is reacted to produce the oxygen barrier copolymer (14, 16). The oxygen barrier copolymer comprises repeating units (14) derived from vinylidene chloride (10), and oxygen scavenging repeating units (16) derived from vinyl compound (12). The cyclohexenyl moiety of repeating unit (16) is capable of scavenging oxygen. The number and sequence of repeating units (14, 16) can depend on the amount of each of the chemical units (10, 12) present in the plurality of chemical units reacted.

Any polymerization technique known can be used, such as free radical polymerization, Ziegler-Natta polymerization, or metallocene-catalyst based polymerization. Such techniques and appropriate initiators/catalysts useful therein are known in the art.

After the preparation of the oxygen barrier copolymer from vinylidene chloride and the oxygen scavenging monomer, the copolymer is then typically extruded as a melt. The extruded melt is then cooled and pelletized to form pellets. However, the extruded product can take other forms such as a powder, a film, or the melt can be fed directly into a process for synthesis of a packaging article.

The amount of oxygen scavenging repeating units in the oxygen barrier copolymer depends in part on whether the oxygen barrier copolymer is to be blended with polyvinylidene chloride (PVDC) polymer. As explained above, polyvinylidene chloride polymers can be (A) polyvinylidene chloride homopolymers or (B) polyvinylidene chloride copolymers, and comonomers that can be used in making polyvinylidene copolymers include acrylonitrile, methyl methacrylate, methyl acrylate and vinyl chloride, among others.

In certain embodiments in which the oxygen barrier copolymer is not blended with PVDC polymer (e.g., PVDC homopolymer or copolymer), the oxygen barrier copolymer can comprise at least about 2 mole % of oxygen scavenging repeating unit, or more preferably between about 5 mole % and 50 mole % of oxygen scavenging repeating unit. Still more preferably the oxygen barrier copolymer comprises between about 5 mole % and 30 mole % of oxygen scavenging repeating unit. When the oxygen barrier copolymer is to be used without blending with PVDC polymer the amount of oxygen scavenging repeating units in the polymer is preferably below the amount that would plasticize the copolymer, and preferably does not cause a significant lowering in passive barrier properties relative to those of PVDC homopolymer or copolymer.

In certain embodiments in which the oxygen barrier copolymer is blended with PVDC polymer, the oxygen barrier copolymer can comprise between about 5 mole % and 50 mole % of the oxygen scavenging repeating unit, and more preferably between about 10 mole % and 50 mole %. Preferably, such oxygen barrier copolymers are blended with sufficient PVDC homopolymer or copolymer so that the composition produced has barrier properties similar to or better than those of PVDC polymer in the presence of an oxidation catalyst, and optionally a photoinitiator.

Oxygen Barrier Compositions

Oxygen barrier compositions of the present invention comprise an oxygen barrier copolymer as described above, and the composition comprises at least about 50 mole % of repeating units having formula (I) and at least about 2% oxygen scavenging repeating units having formula (II). The composition can optionally further comprise an oxidation catalyst and/or a photoinitiator. The composition can further comprise a blend of the oxygen barrier copolymer and PVDC polymer(s). Other additives which can be included in the oxygen barrier composition include, but are not necessarily limited to, antioxidant, fillers, pigments, dyestuffs, stabilizers, processing aids, plasticizers, fire retardants, and anti-fog agents, among others.

The oxygen barrier compositions of the present invention preferably comprise scavenging moieties at a level below that which would significantly reduce the inherent crystallinity and physical barrier properties of the composition to a level significantly less than that of a homopolymer or copolymer of polyvinylidene chloride. In certain embodiments, the composition comprises a polymer blend that comprises polyvinylidene chloride homopolymer or copolymer, and the oxygen barrier copolymer. In such embodiments, the concentration of oxygen scavenging moieties in the oxygen barrier copolymer can be relatively high, as described above. The concentration of oxygen scavenging moieties in the oxygen barrier copolymer is preferably lower if the oxygen barrier copolymer is not blended with PVDC polymer. As described above, the oxygen barrier copolymer that is not blended with PVDC polymer, preferably has oxygen scavenging repeating units at a concentration less than would cause the copolymer to have lower barrier properties than PVDC polymer.

Oxygen barrier copolymers and compositions of the present invention have oxygen barrier properties contributed by repeating units derived from vinylidene chloride and the oxygen scavenging properties from oxygen scavenging repeating units that comprise unsaturated olefinic, oxygen scavenging moieties. Oxygen can have low accessibility to the oxygen scavenging moieties in the oxygen barrier compositions of the present invention due to barrier properties of the structural characteristics of polyvinylidene chloride, such that only trace amounts of oxygen will reach the scavenging moieties. The scavenging moieties are typically not consumed quickly, since only small amounts of oxygen are capable of permeating the oxygen barrier compositions of the present invention.

A number of compounds can be added to oxygen barrier compositions of the present invention, in order to enhance the oxygen scavenging functionality of the oxygen barrier polymer. Some such additives can enhance the functionality of the oxygen scavenging moieties during storage, processing of the composition into a layer of a packaging article, or use of such a packaging article. Such enhancements include, but are not limited to, limiting the rate of oxygen scavenging by the oxygen scavenging moieties prior to filling of a packaging article comprising the oxygen barrier composition, initiating oxygen scavenging by the oxygen scavenging moieties at a desired time, limiting the induction period (the period between initiating oxygen scavenging and scavenging of oxygen at a desired rate), or rendering the composition comprising the oxygen barrier polymer stronger or more transparent, among others. Such additives are known for use with oxygen scavenging polymers.

As stated above, the oxygen barrier composition comprises an oxygen barrier copolymer, and it can further comprise an oxidation catalyst, such as a transition metal catalyst. The transition metal catalyst functions to catalyze oxygen scavenging by the oxygen scavenging repeating units (e.g., repeating units having formula (II)), increasing the rate of scavenging and reducing the induction period. Though not to be bound by theory, useful transition metals for oxidation catalysts include those, which can readily interconvert between at least two oxidation states. See Sheldon, R. A.; Kochi, J. K.; "Metal-Catalyzed Oxidations of Organic Compounds" Academic Press, New York 1981.

Preferably, the oxidation catalyst can be a transition metal in the form of a salt, with the transition metal selected from the first, second or third transition series of the Periodic Table. Suitable metals include, but are not limited to, manganese, iron, cobalt, nickel, copper, rhodium, and ruthenium. The oxidation state of the metal when introduced need not necessarily be that of the active form. The metal is preferably iron, nickel, manganese, cobalt or copper; more preferably manganese or cobalt; and most preferably cobalt. Suitable counterions for the metal include, but are not limited to, chloride, acetate, oleate, stearate, palmitate, 2-ethylhexanoate, neodecanoate, or naphthenate; preferably, the counterion is selected from $C_1$–$C_{20}$ alkanoates. Preferably, the salt, the transition metal, and the counterion are either on the U.S. Food and Drug Administration GRAS (generally regarded as safe) list, or exhibit substantially no migration from the packaging article to the product (i.e. less than about 500 ppb, preferably less than about 50 ppb, in the product). Particularly preferable salts include cobalt oleate, cobalt stearate, cobalt 2-ethylhexanoate, and cobalt neodecanoate. The metal salt can also be an ionomer, in which case a polymeric counterion is employed. Such ionomers are well known in the art.

Typically, the amount of transition metal can range from 0.001 to 1% (10 to 10,000 ppm) of the composition, based on the metal content only (excluding ligands, counterions, etc.). In a packaging article, the transition metal can be formed in an oxygen barrier layer comprising the oxygen barrier copolymer of the invention, or in a layer adjacent to the oxygen barrier layer.

Another compound that can be added to the composition is a photoinitiator, or a blend of different photoinitiators. A photoinitiator is preferred if antioxidants are included in the composition to prevent premature oxidation of the oxygen scavenging moieties.

Suitable photoinitiators are well known to those skilled in the art. Specific examples include, but are not limited to, benzophenone, o-methoxybenzophenone, acetophenone, o-methoxy-acetophenone, acenaphthenequinone, methyl ethyl ketone, valerophenone, hexanophenone, α-phenyl-butyrophenone, p-morpholinopropiophenone, dibenzosuberone, 4-morpholinobenzophenone, benzoin, benzoin methyl ether, 4-o-morpholinodeoxybenzoin, p-diacetylbenzene, 4-aminobenzophenone, 4'-methoxyacetophenone, α-tetralone, 9-acetylphenanthrene, 2-acetylphenanthrene, 10-thioxanthenone, 3-acetylphenanthrene, 3-acetylindole, 9-fluorenone, 1-indanone, 1,3,5-triacetylbenzene, thioxanthen-9-one, xanthene-9-one, 7-H-benz[de] anthracen-7-one, benzoin tetrahydropyranyl ether, 4,4'-bis (dimethylamino)-benzophenone, 1'-acetonaphthone, 2'-acetonaphthone, acetonaphthone and 2,3-butanedione, benz[a]anthracene-7,12-dione, 2,2-dimethoxy-2-phenylacetophenone, α,α-diethoxyacetophenone, and α,α-dibutoxyacetophenone, among others. Singlet oxygen generating photosensitizers such as Rose Bengal, methylene blue, and tetraphenyl porphine can also be employed as photoinitiators. Polymeric initiators include poly(ethylene carbon monoxide) and oligo [2-hydroxy-2-methyl-1-[4-(1-methylvinyl)phenyl]propanone].

Photoinitiators that are especially useful in the present invention include benzophenone derivatives containing at least two benzophenone moieties, as described in copending U.S. patent application Ser. No. 08/857,325, filed May 16, 1997. These compounds act as effective photoinitiators to initiate oxygen scavenging activity in the oxygen barrier composition of the present invention. Such benzophenone derivatives have a very low degree of extraction from polymeric compositions, which can lead to reduced malodor or off-taste of a packaged food, beverage, or oral pharmaceutical product by extracted photoinitiator.

A "benzophenone moiety" is a substituted or unsubstituted benzophenone group. Suitable substituents include alkyl, aryl, alkoxy, phenoxy, and alicyclic groups contain from 1 to 24 carbon atoms or halides.

The benzophenone derivatives include dimers, trimers, tetramers, and oligomers of benzophenones and substituted benzophenones.

The benzophenone photoinitiators are represented by the formula:

$$A_a(B)_b$$

wherein A is a bridging group selected from sulfur; oxygen; carbonyl; —SiR''$_2$—, wherein each R'' is individually selected from alkyl groups containing from 1 to 12 carbon atoms, aryl groups containing 6 to 12 carbon atoms, or alkoxy groups containing from 1 to 12 carbon atoms; —NR'''—, wherein R''' is an alkyl group containing 1 to 12 carbon atoms, an aryl group containing 6 to 12 carbon atoms, or hydrogen; or an organic group containing from 1 to 50 carbon atoms; a is an integer from 0 to 11; B is a substituted or unsubstituted benzophenone group; and b is an integer from 2 to 12.

The bridging group A can be a divalent group, or a polyvalent group with 3 or more benzophenone moieties. The organic group, when present, can be linear, branched, cyclic (including fused or separate cyclic groups), or an arylene group (which can be a fused or non-fused polyaryl group). The organic group can contain one or more heteroatoms, such as oxygen, nitrogen, phosphorous, silicon, or sulfur, or combinations thereof. Oxygen can be present as, for example, an ether, ketone, aldehyde, ester, or alcohol.

The substituents of B herein R'', when present, are individually selected from alkyl, aryl, alkoxy, phenoxy, or alicyclic groups containing from 1 to 24 carbon atoms, or halides. Each benzophenone moiety can have from 0 to 9 substituents. Substituents can be selected to render the photoinitiator more compatible with the oxygen barrier composition.

Examples of such benzophenone derivatives comprising two or more benzophenone moieties include dibenzoyl biphenyl, substituted dibenzoyl biphenyl, benzoylated terphenyl, substituted benzoylated terphenyl, tribenzoyl triphenylbenzene, substituted tribenzoyl triphenylbenzene, benzoylated styrene oligomer (a mixture of compounds containing from 2 to 12 repeating styrenic groups, comprising dibenzoylated 1,1-diphenyl ethane, dibenzoylated 1,3-diphenyl propane, dibenzoylated 1-phenyl naphthalene, dibenzoylated styrene dimer, dibenzoylated styrene trimer, and tribenzoylated styrene trimer), and substituted benzoylated styrene oligomer. Tribenzoyl triphenylbenzene and substituted tribenzoyl triphenylbenzene are especially preferred.

When a photoinitiator is used, its primary function is to enhance and facilitate the initiation of oxygen scavenging by an oxygen barrier layer comprising the oxygen barrier copolymer upon exposure to radiation. However, due to the high cost of photoinitiators, it is desirable to use the minimum amount of photoinitiator required to initiate oxygen scavenging. This minimum amount will vary depending on the photoinitiator used, the wavelength and intensity of ultraviolet light used to initiate, the ratio of oxygen scavenging repeating units and other repeating units in the composition, the particular oxygen scavenging moiety used, or the nature and amount of antioxidants used. The amount of photoinitiator also depends on the intended use of the composition. For instance, if the photoinitiator-containing component is placed underneath a layer, which is somewhat opaque to the radiation used, more initiator may be needed. For most purposes, however, the amount of photoinitiator, when used, will be in the range of 0.01 to 10% by weight of the oxygen barrier composition. Preferably, the photoinitiator is either on the U.S. Food and Drug Administration GRAS (generally regarded as safe) list, or exhibits substantially no migration from the packaging article to the product (i.e. less than 50 ppb in the product).

Antioxidants can be used in the oxygen barrier composition to control scavenging initiation by the oxygen scavenging moieties. An antioxidant as defined herein is a material, which inhibits oxidative degradation or cross-linking of polymers. Typically, antioxidants are added to facilitate the processing of polymeric materials or prolong their useful lifetime. In relation to this invention, such additives prolong the induction period for oxygen scavenging by the oxygen scavenging moieties in the absence of irradiation. When it is desired to commence oxygen scavenging by the oxygen scavenging moieties of the oxygen barrier composition, the composition (and any incorporated photoinitiator) can be exposed to radiation.

Antioxidants such as 2,6-di(t-butyl)-4-methylphenol (BHT), 2,2'-methylene-bis(6-t-butyl-p-cresol), triphenylphosphite, tris-(nonylphenyl)phosphite, vitamin E, tetra-bismethylene 3-(3,5-ditertbutyl-4-hydroxyphenyl)-propionate methane, and dilaurylthiodipropionate are suitable for use with this invention.

The amount of an antioxidant, if present, can also have an effect on oxygen scavenging. As mentioned earlier, such materials are usually present to prevent oxidation or gelation of polymers. Typically, they are present in about 0.01 to 1% by weight of the composition. However, additional amounts of antioxidant can also be added, if desired.

An embodiment of the present invention is directed to a method of preparing an oxygen barrier composition. The method comprises blending polyvinylidene chloride homopolymer or copolymer with an oxygen barrier copolymer and an oxidation catalyst, as described above. The oxygen barrier copolymer used to in the method comprises at least 5 mole % of repeating units having formula (II). The oxygen barrier composition prepared by this method comprises at least about 50 mole % of repeating units having formula (I). The oxygen barrier composition can further comprise a photoinitiator.

After being made, it can be used in forming an oxygen barrier layer in a packaging article. By "oxygen barrier layer" is meant a layer comprising the oxygen barrier copolymer, as described below, and optionally an oxidation catalyst and/or a photoinitiator. Because of the presence of the oxygen scavenging moieties, the oxygen barrier layer can be referred to as an "active oxygen barrier layer." In forming an oxygen barrier layer, the composition can be fed from the extruder or other blending apparatus directly into further steps of the method.

Oxygen Barrier Packaging Articles

Another embodiment of the present invention is directed to a packaging article comprising an oxidation catalyst and at least one oxygen barrier layer comprising an oxygen barrier copolymer, as described above. The oxygen barrier copolymer comprises at least about 50 mole % of repeating units having formula (I) and at least about 5 mole % of repeating units having formula (II). The packaging article can comprise any oxygen barrier composition described above.

Packaging articles typically come in several forms including a single layer flexible article, a multilayer flexible article, a single layer rigid article, or a multilayer rigid article. Typical packaging articles include plastic, paper or cardboard cartons or bottles such as juice containers, soft drink containers, thermoformed trays, or cups. Packaging articles can have wall thicknesses in the range of 5 to 1000 micrometers. The walls of such articles either comprise single or multiple layers of material.

The packaging article comprising the oxygen barrier composition can be used to package any product for which it is desirable to inhibit oxygen damage during storage, e.g. food, beverage, pharmaceuticals, medical products, cosmetics, corrodible metals, or electronic devices. It is especially useful for packaging products for which it is desirable to maintain a high oxygen barrier for a long period of time, e.g. beer, wine, and other beverages. It is also especially useful for packaging products for which it is desirable to retain carbon dioxide, e.g. beer, sparkling wine, and soft drinks.

The packaging article comprising the oxygen barrier composition can consist essentially of a single layer comprising the oxygen barrier copolymer, or it can comprise at least one first oxygen barrier layer and additional layers, such as an oxygen scavenging layer, an oxygen barrier layer not comprising the polymer of the present invention, a food-contact layer, a structural layer, or an adhesive layer, alone or in any combination. Single layered packaging articles can be prepared by solvent casting, injection molding, blow molding, or by extrusion, among other techniques. Packaging articles with multiple layers are typically prepared using coextrusion, injection molding, blow molding, coating, or lamination, among other techniques.

In addition to the first oxygen barrier layer, if the packaging article of the present invention is a multilayer article, it can comprise other layers useful in a flexible or rigid multilayer packaging article.

As stated above, the oxidation catalyst can be included either in the oxygen barrier layer or in a layer adjacent to the oxygen barrier layer. A transition metal salt as described above can be formed in an adjacent layer or blended in to the oxygen barrier layer itself.

The oxygen barrier layer can further comprise a photoinitiator, an antioxidant, or both, as described above. Other additives, as described above, can also be included as desired. When it is desired to commence oxygen scavenging by the oxygen scavenging moiety of the oxygen barrier layer of the packaging article, the packaging article (and any incorporated photoinitiator) can be exposed to radiation.

A multilayer packaging article of the present invention can also comprise at least one structural layer located to the interior, the exterior, or both of the oxygen barrier layer. The structural layer or layers comprise a structural polymer that imparts useful structural properties, such as rigidity, flexibility, or strength, among others, to the packaging article. Blends of different structural polymers can also be used. However, the selection of the structural polymer largely depends on the article to be manufactured and the end use thereof. Such selection factors are well known in the art.

Preferably, the structural polymer is selected from PET, polyamides, polypropylene, polyethylene, low density polyethylene, very low density polyethylene, ultra-low density polyethylene, high density polyethylene, polyvinyl chloride, ethylene-vinyl acetate, ethylene-alkyl (meth) acrylates, ethylene-(meth)acrylic acid, or ethylene-(meth) acrylic acid ionomers. If the packaging article is a carton the structural layer can comprise paperboard or cardboard.

The packaging article can further comprise an oxygen scavenging layer. In certain embodiments, the oxygen scavenging layer can be a liner, coating, sealant, gasket, adhesive insert, non-adhesive insert, or fibrous mat insert in the packaging article. The oxygen scavenging layer can comprise an oxygen scavenging polymer selected from the group consisting of ethylene/methyl acrylate/cyclohexenylmethyl acrylate terpolymer (EMCM), ethylene/vinyl cyclohexene copolymer (EVCH), ethylene/cyclohexenylmethyl acrylate copolymer (ECHA), and cyclohexenylmethyl acrylate homopolymer (CHAA), among others.

Additionally, a multilayer packaging article according to the present invention can further comprise an additional oxygen barrier layer, i.e. a layer having an oxygen transmission rate equal to or less than 100 cubic centimeters per square meter ($cc/m^2$) per day per atmosphere at room temperature (about 25° C.). The additional oxygen barrier layer can comprise the oxygen barrier copolymer of the present invention, or it can comprise an oxygen barrier polymer known in the art (e.g., a barrier polymer that does not comprise an oxygen scavenging moiety). Typical oxygen barrier layers that can be used can comprise an oxygen barrier polymer selected from vinyl alcohol polymers, polyesters, vinylidene chloride polymers, epoxy polymers, polysulfones, acrylonitrile polymers, isocyanate polymers, and polyamides, and mixtures thereof, among others. However, because the oxygen scavenging copolymer can inhibit oxygen transmission to a high degree, the need for a separate oxygen barrier layer is reduced and can, depending on the form of the packaging article and the intended use, be dispensed with entirely, if desired.

Other additional layers of a multilayer packaging article can include one or more layers permeable to oxygen. In one packaging article, preferred for flexible packaging of food and scavenging of oxygen found in the packaged food, the layers include, in order starting from the outside of the package to the innermost layer of the package, (i) an oxygen barrier layer comprising an oxygen barrier copolymer of the present invention, (ii) an optional oxygen scavenging layer, and (iii) an optional oxygen-permeable layer. Control of the oxygen barrier property of (i) limits the rate of oxygen entry to the oxygen scavenging moieties in layer (ii), and thus slows the consumption of oxygen scavenging capacity by atmospheric oxygen. Control of the oxygen permeability of layer (iii) impacts the rate of oxygen scavenging for the overall structure. Furthermore, layer (iii) can provide a barrier to migration of the components of the outer layers, or by-products of the reaction of such components with oxygen or other reactants, into the package interior. Even further, layer (iii) can improve the heat-sealability, clarity, or resistance to blocking of the multilayer packaging article.

Further additional layers, such as adhesive layers or tie layers, can also be used in the multilayer packaging article. Compositions typically used for adhesive layers include anhydride functional polyolefins and other well-known adhesive layers.

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

EXAMPLE 1

Preparation of Oxygen Barrier Copolymer

All starting materials for Examples 1 and 2 were purchased from Aldrich and used without purification unless noted. 100 parts by weight of vinylidene chloride, 17 parts by weight 3-cyclohexenyl methyl acrylate, and 223 parts by weight of toluene were charged to a 250 mL high pressure reaction tube equipped with a stir bar. The reaction vessel was then deoxygenated via nitrogen purge for 20 minutes at 4° C. 2.57 parts of azobisisobutyrnitrile was added, and the reaction tube was sealed and left under nitrogen. The vessel was then heated at 50° C. for 8 hrs. The reaction solution was added dropwise to methanol. The precipitated polymer was filtered and washed several times with acetone. It was dried in a vacuum oven at 50° C. overnight to remove volatile solvents. $^1$H-NMR (300 MHz) were recorded on a Varian Oxford 300 instrument in $CDCl_3$. Melting temperatures $T_m$ were taken from differential scanning calorimeter thermograms. The melting points were easily measured with good reproducibility. The samples were cooled to −40° C. with liquid nitrogen and then warmed to +200° C. at a heating rate of 10° C./min. $^1$H-NMR (300 MHz, $CDCl_3$) δ (Ppm): 1.4–2.1 (m, 7H), 2.8 (m, 1H), 3.2 (m, 1H), 3.6 (m, 1H), 4.10 (d, 2H), 5.75 (s, 2H). $T_m$ at 150° C. 44% yield.

EXAMPLE 2

Preparation of Oxygen Barrier Copolymer 100 parts by weight of vinylidene chloride, 9 parts by weight 3-cyclohexenyl methyl acrylate, and 223 parts by weight of toluene were charged to a 250 mL high pressure reaction tube equipped with a stir bar. The reaction vessel was then deoxygenated via nitrogen purge for 20 minutes at 4° C. 2.57 parts of azobisisobutyrnitrile were added, and the reaction tube was sealed and left under nitrogen. The vessel was then heated at 50° C. for 8 hrs. The reaction solution was added dropwise to methanol. The precipitated polymer was filtered and washed several times with acetone. It was dried in a vacuum oven at 50° C. overnight to remove volatile solvents. $^1$H-NMR (300 MHz) were recorded on a Varian Oxford 300 instrument in $CDCl_3$. Melting temperatures $T_m$ were taken from differential scanning calorimeter thermograms. The points were easily measured with good reproducibility. The samples were cooled to −40° C. with liquid nitrogen and then warmed to +200° C. at a heating rate of 10° C./min. $^1$H-NMR (300 MHz, $CDCl_3$) δ (ppm): 1.4–2.1 (m, 7H), 2.8 (m, 1H), 3.2 (m, 1H), 3.6 (m, 1H), 4.10 (d, 2H), 5.75 (s, 2H). $T_m$ at 160.5° C. 45% yield.

All of the compositions and methods disclosed and claimed herein can be made and executed without undue experimentation in light of the present disclosure. While the compositions and methods of this invention have been described in terms of preferred embodiments, it will be apparent to those of skill in the art that variations may be applied to the compositions and methods and in the steps or in the sequence of steps of the method described herein without departing from the concept, spirit and scope of the invention. More specifically, it will be apparent that certain agents which are chemically related may be substituted for the agents described herein while the same or similar results would be achieved. All such similar substitutes and modifications apparent to those skilled in the art are deemed to be within the spirit, scope and concept of the invention as defined by the appended claims.

What is claimed is:

1. An oxygen barrier composition, comprising:

an oxygen barrier copolymer comprising repeating units having the formula (I), and repeating units having formula (II),

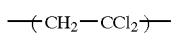
(I)

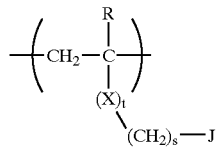
(II)

wherein R is hydrogen or methyl; X is —(C=O)—O—, —O—(C=O)—, —(C=O)—NH—, —O—; t is 0 or 1; s is an integer between 0 and 12, inclusive; J is a cycloalkenyl group; and wherein the composition comprises at least about 50 mole % of repeating units having formula (I) and at least about 2 mole % of repeating units having formula (II).

2. The composition of claim 1, wherein the oxygen barrier copolymer comprises 50 mole % of repeating units having formula (I) and at least about 5 mole % of repeating units having formula (II).

3. The composition of claim 1, wherein J is selected from substituted cyclohexenyls, unsubstituted cyclohexenyl, substituted norbornenyl, and unsubstituted norbornenyl.

4. The composition of claim 1, wherein J is selected from chemical groups having the formula (VI) or the formula (VII)

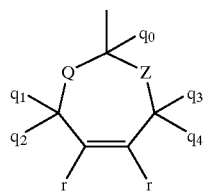
(VI)

(VII)

wherein Q is —$(CR_2R_3)_n$—; n is an integer from 0 to 3, inclusive; Z is —$(CR_4R_5)_e$—; e is an integer from 0 to 3, inclusive; n+e≦3; $q_0$, $q_1$, $q_2$, $q_3$, $q_4$, r, each $R_2$, each $R_3$, each $R_4$, and each $R_5$ are independently selected from hydrogen, linear $C_1$–$C_{20}$ alkyls, branched $C_1$–$C_{20}$ alkyls, Cyclic $C_1$–$C_{20}$ alkyls, polycyclic $C_1$–$C_{20}$ alkyls, aromatic groups, halogens, and sulfur-containing substituents; in formula (VI) when r is hydrogen at least one of $q_1$, $q_2$, $q_3$, and $q_4$ is hydrogen; and in formula (VII) when r is hydrogen at least one of $q_1$ and $q_2$ is hydrogen.

5. The composition of claim 1, wherein the copolymer further comprises a plurality of units having formula (IV)

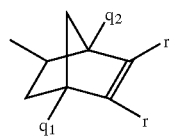
(IV)

wherein $R_6$ is hydrogen or methyl, and $R_7$ is —CN or —COOR", and wherein R" is H or a $C_1$–$C_6$ alkyl.

6. The composition of claim 5, wherein $R_7$ is —COOH or —COOCH$_3$.

7. The composition of claim 1, wherein the composition further comprises an oxidation catalyst.

8. The composition of claim 7, wherein the oxidation catalyst comprises a transition metal selected from cobalt, copper, nickel, iron, manganese, rhodium, or ruthenium.

9. The composition of claim 1, further comprising at least one material selected from photoinitiators and antioxidants.

10. The composition of claim 1, wherein the composition comprises a polymer blend comprising a polyvinylidene chloride polymer.

11. A method of preparing an oxygen barrier composition, comprising:

blending a mixture comprising a polyvinylidene chloride polymer, an oxidation catalyst, and an oxygen barrier copolymer to produce an oxygen barrier composition, wherein the oxygen barrier copolymer comprises repeating units having the formula (I), and repeating units having formula (II)

(I)

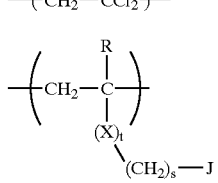
(II)

wherein R is hydrogen or methyl; X is —(C=O)—O—, —O—(C=O)—, —(C=O)—NH—, —O—; t is 0 or 1; s is an integer between 0 and 12, inclusive; J is a cycloalkenyl group; and wherein the oxygen barrier copolymer comprises at least about at least about 50 mole % of repeating units having the formula (I) and at least about 5 mole % of repeating units having formula (II).

12. The method of claim 11, wherein J is selected from substituted cyclohexenyls, unsubstituted cyclohexenyl, substituted norbornenyl, and unsubstituted norbornenyl.

13. The method of claim 11, wherein J is selected from chemical groups having the formula (VI) or the formula (VII)

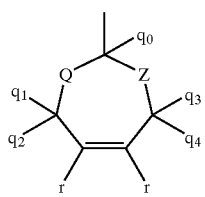
(VI)

(VII)

wherein Q is —$(CR_2R_3)_n$—; n is an integer from 0 to 3, inclusive; Z is —$(CR_4R_5)_e$—; e is an integer from 0 to 3, inclusive; n+e≦3; $q_0$, $q_1$, $q_2$, $q_3$, $q_4$, r, each $R_2$, each $R_3$, each $R_4$, and each $R_5$ are independently selected from hydrogen, linear $C_1$–$C_{20}$ alkyls, branched $C_1$–$C_{20}$ alkyls, cyclic $C_1$–$C_{20}$ alkyls, polycyclic $C_1$–$C_{20}$ alkyls, aromatic groups, halogens, and sulfur-containing substituents; in formula (VI)

when r is hydrogen at least one of $q_1$, $q_2$, $q_3$, and $q_4$ is hydrogen; and in formula (VII) when r is hydrogen at least one of $q_1$ and $q_2$ is hydrogen.

14. The method of claim 11, wherein the copolymer further comprises a plurality of units having formula (IV)

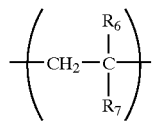

(IV)

wherein $R_6$ is hydrogen or methyl, and $R_7$ is —CN or —COOR", and wherein R" is H or a $C_1$–$C_6$ alkyl.

15. The method of claim 14, wherein $R_7$ is —COOH or —COOCH$_3$.

16. The method of claim 11, wherein the oxidation catalyst comprises a transition metal selected from cobalt, copper, nickel, iron, manganese, rhodium, or ruthenium.

17. The method of claim 11, wherein the mixture further comprises at least one material selected from photoinitiators and antioxidants.

* * * * *

UNITED STATES PATENT AND TRADEMARK OFFICE
CERTIFICATE OF CORRECTION

PATENT NO. : 6,818,151 B2
DATED : November 16, 2004
INVENTOR(S) : Hu Yang et al.

It is certified that error appears in the above-identified patent and that said Letters Patent is hereby corrected as shown below:

Column 17,
Line 24, delete the first instance of "norbornenyl" and insert -- norbornenyls --.

Column 18,
Line 40, delete the first instance of "norbornenyl" and insert -- norbornenyls --.

Signed and Sealed this

Fourteenth Day of June, 2005

JON W. DUDAS
*Director of the United States Patent and Trademark Office*